United States Patent
Yokota et al.

(10) Patent No.: US 12,039,039 B1
(45) Date of Patent: Jul. 16, 2024

(54) INFORMATION PROCESSING DEVICE AND CONTROL METHOD FOR INFORMATION PROCESSING DEVICE

(71) Applicant: Panasonic Automotive Systems Co., Ltd., Kanagawa (JP)

(72) Inventors: Kaoru Yokota, Hyogo (JP); Yuishi Torisaki, Osaka (JP); Shoichiro Sekiya, Osaka (JP); Takumaru Nagai, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/629,160

(22) Filed: Apr. 8, 2024

Related U.S. Application Data

(63) Continuation of application No. PCT/JP2023/003983, filed on Feb. 7, 2023.

(30) Foreign Application Priority Data

Sep. 27, 2022 (JP) ................. 2022-153360

(51) Int. Cl.
G06F 21/00 (2013.01)
G06F 21/55 (2013.01)
G06F 21/57 (2013.01)

(52) U.S. Cl.
CPC .......... *G06F 21/552* (2013.01); *G06F 21/575* (2013.01); *G06F 2221/033* (2013.01)

(58) Field of Classification Search
CPC . G06F 21/552; G06F 21/575; G06F 2221/033
See application file for complete search history.

(56) References Cited

U.S. PATENT DOCUMENTS

2018/0210801 A1* 7/2018 Wu ................. H04L 43/20
2018/0307576 A1* 10/2018 Debnath ............ G06F 11/34
(Continued)

FOREIGN PATENT DOCUMENTS

JP 2019-057167 A 4/2019
JP 2020-126586 A 8/2020
(Continued)

OTHER PUBLICATIONS

International Search Report issued in WIPO Patent Application No. PCT/JP2023/003983, dated May 9, 2023, together with an English-language translation.
(Continued)

*Primary Examiner* — Ghazal B Shehni
(74) *Attorney, Agent, or Firm* — GREENBLUM & BERNSTEIN, P.L.C.

(57) ABSTRACT

An information processing device includes: a log transmitter that transmits a monitoring log generated in the information processing device to an SOC (28); an HIDS monitor that verifies an integrity of the log transmitter; and a monitoring ROT that verifies an integrity of the HIDS monitor, and repeatedly outputs a heartbeat signal to the log transmitter. Each time the heartbeat signal is output from the monitoring ROT, the log transmitter transmits the heartbeat signal to the SOC. When the integrity of the log transmitter is anomalous, the HIDS monitor outputs, to the monitoring RoT, an output stop request signal for requesting the monitoring ROT to stop outputting the heartbeat signal. The monitoring RoT stops outputting the heartbeat signal based on the output stop request signal.

11 Claims, 6 Drawing Sheets

(56) References Cited

U.S. PATENT DOCUMENTS

2018/0330091 A1* 11/2018 Prowell ................ G06F 21/552
2020/0226292 A1 7/2020 Feist et al.
2023/0229762 A1 7/2023 Yokota et al.

FOREIGN PATENT DOCUMENTS

JP  2020-129238 A  8/2020
WO  2022/085260 A1  4/2022

OTHER PUBLICATIONS

Written Opinion of the International Searching Authority (WO/ISA) issued in WIPO Patent Application No. PCT/JP2023/003983, dated May 9, 2023, along with an English translation thereof.

* cited by examiner

INFORMATION PROCESSING DEVICE AND CONTROL METHOD FOR INFORMATION PROCESSING DEVICE

CROSS REFERENCE TO RELATED APPLICATIONS

This is a continuation application of PCT International Application No. PCT/JP2023/003983 filed on Feb. 7, 2023, designating the United States of America, which is based on and claims priority of Japanese Patent Application No. 2022-153360 filed on Sep. 27, 2022.

FIELD

The present disclosure relates to an information processing device and a control method for an information processing device.

BACKGROUND

As security measures for firmware, not only integrity verification (secure boot) at the time of firmware startup but also constant integrity (runtime integrity (RI)) verification after firmware startup is desired.

An information processing device used in conventional security measures includes a monitor that operates in a non-secure region and a log collector that operates in a secure region (see, for example, Patent Literature (PTL) 1). The monitor monitors whether there is an anomaly in the information processing device. The monitor then generates a monitoring log indicating the monitoring result, and stores the generated monitoring log in first memory. The log collector collects the monitoring log stored in the first memory, and stores the collected monitoring log in second memory. The monitoring log stored in the second memory is transmitted to a security operation center (SOC).

CITATION LIST

Patent Literature

PTL 1: Japanese Unexamined Patent Application Publication No. 2020-129238

SUMMARY

However, the foregoing conventional information processing device can be improved upon.

In view of the above, the present disclosure provides an information processing device and a control method for an information processing device capable of improving upon the above related art.

An information processing device according to an aspect of the present disclosure includes: a transmitter that communicates with an external device, and transmits a monitoring log generated in the information processing device to the external device; a first monitor that verifies an integrity of internal processing of the information processing device; and a second monitor that verifies an integrity of the first monitor, and repeatedly outputs a heartbeat signal to the transmitter, wherein each time the heartbeat signal is output from the second monitor, the transmitter transmits the heartbeat signal to the external device, when the integrity of the internal processing of the information processing device is anomalous, the first monitor outputs, to the second monitor, an output stop request signal for requesting the second monitor to stop outputting the heartbeat signal or output an invalid heartbeat signal, and the second monitor stops outputting the heartbeat signal or outputs the invalid heartbeat signal based on the output stop request signal.

These general and specific aspects may be implemented using a system, a method, an integrated circuit, a computer program, or a computer-readable recording medium such as compact disc-read only memory (CD-ROM), or any combination of systems, methods, integrated circuits, computer programs, and recording media.

With the information processing device, etc. according to an aspect of the present disclosure, it is possible to improve upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
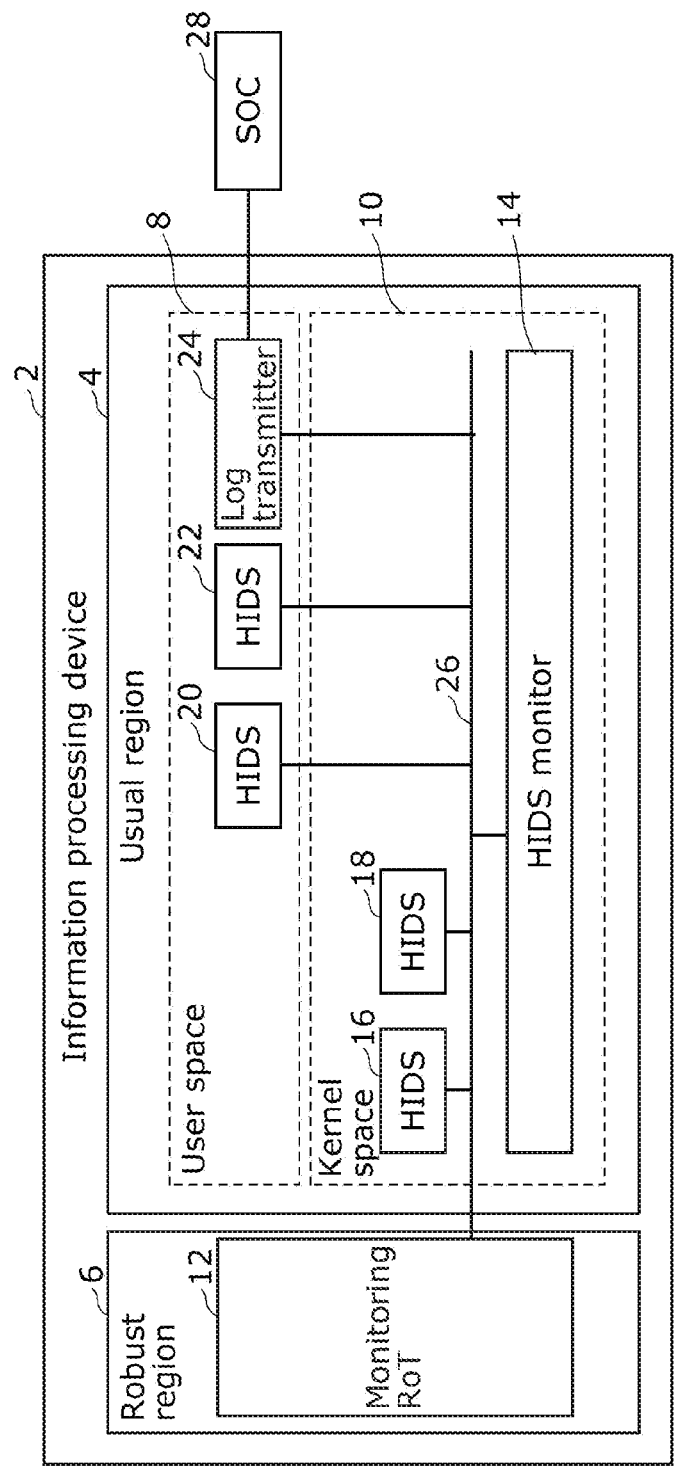
FIG. 1 is a diagram illustrating an overview of an information processing device according to Embodiment 1.

DESCRIPTION OF EMBODIMENT (Underlying Knowledge Forming Basis of the Present Disclosure)

The inventors of the present disclosure found that the technique described in "Background Art" section has a problem described below.

The foregoing conventional information processing device has a problem in that the integrity of the operation of transmitting monitoring logs to the SOC is not ensured. In detail, even when the monitor detects an anomaly, it cannot be ensured that a monitoring log indicating that the anomaly is detected is reliably transmitted to the SOC. There is thus a possibility that the SOC cannot know the detection of the anomaly and the detected anomaly is left unaddressed without any measure for the anomaly being taken.

In order to solve the problem as described above, an information processing device according to a first aspect of the present disclosure includes: a transmitter that communicates with an external device, and transmits a monitoring log generated in the information processing device to the external device; a first monitor that verifies an integrity of internal processing of the information processing device; and a second monitor that verifies an integrity of the first monitor, and repeatedly outputs a heartbeat signal to the transmitter, wherein each time the heartbeat signal is output from the second monitor, the transmitter transmits the heartbeat signal to the external device, when the integrity of the internal processing of the information processing device is anomalous, the first monitor outputs, to the second monitor, an output stop request signal for requesting the second monitor to stop outputting the heartbeat signal or output an invalid heartbeat signal, and the second monitor stops outputting the heartbeat signal or outputs the invalid heartbeat signal based on the output stop request signal.

According to this aspect, the first monitor outputs the output stop request signal to the second monitor in the case where the integrity of internal processing (for example, the transmitter) of the information processing device is anomalous. Hence, in the case where the reception of the heartbeat signal from the information processing device is interrupted or the external device receives an invalid heartbeat signal from the information processing device, the external device can detect, for example, that the transmitter in the information processing device has been compromised.

In a second aspect of the present disclosure, the information processing device according to the first aspect may further include: a first program region in which each of the transmitter and the first monitor operates; and a second program region in which the second monitor operates and that has a security level higher than a security level of the first program region.

According to this aspect, constant integrity (RI) verification for various programs of the information processing device can be executed using, for example, the second monitor as a root of trust.

In a third aspect of the present disclosure, in the information processing device according to the first aspect or the second aspect, the first monitor may output a first monitoring log indicating a result of verifying the integrity of the internal processing of the information processing device, and when the integrity of the internal processing of the information processing device is anomalous, output, to the second monitor, a signature request signal for requesting the second monitor to sign the first monitoring log, the second monitor may sign the first monitoring log based on the signature request signal, and the first monitor may hold the first monitoring log signed by the second monitor.

According to this aspect, in the case where the integrity of internal processing (for example, the transmitter) of the information processing device is anomalous, the first monitoring log indicating that the integrity of internal processing of the information processing device is anomalous can be preserved. The first monitoring log can then be used to analyze, for example, the compromised transmitter.

In a fourth aspect of the present disclosure, in the information processing device according to any one of the first aspect to the third aspect, when the integrity of the first monitor is anomalous, the second monitor may stop outputting the heartbeat signal or output the invalid heartbeat signal.

According to this aspect, as a result of the reception of the heartbeat signal from the information processing device being interrupted or the external device receiving an invalid heartbeat signal from the information processing device, the external device can detect, for example, that at least one of the transmitter or the first monitor in the information processing device has been compromised.

In a fifth aspect of the present disclosure, in the information processing device according to any one of the first aspect to the fourth aspect, when an anomaly of the integrity detected by the first monitor is resolved after the first monitor outputs the output stop request signal, the first monitor may output, to the second monitor, an output resumption request signal for requesting the second monitor to resume outputting the heartbeat signal, and the second monitor may resume outputting the heartbeat signal based on the output resumption request signal.

According to this aspect, as a result of the reception of the heartbeat signal from the information processing device being resumed, the external device can recognize, for example, that the transmitter in the information processing device has been restored.

In a sixth aspect of the present disclosure, the information processing device according to any one of the first aspect to the fifth aspect may further include: an anomaly detector that detects an anomaly in the information processing device, and outputs a second monitoring log indicating a result of detecting the anomaly in the information processing device, the first monitor may further verify an integrity of the anomaly detector, and the anomaly detector may hold the second monitoring log, when the integrity of the internal processing of the information processing device is anomalous.

According to this aspect, the second monitoring log can be preserved even in the case where, for example, the transmitter has been compromised.

In a seventh aspect of the present disclosure, in the information processing device according to any one of the first aspect to the sixth aspect, the first monitor may verify an integrity of the transmitter.

According to this aspect, it is possible to detect that the transmitter in the information processing device has been compromised.

A control method for an information processing device according to an eighth aspect of the present disclosure is a control method for an information processing device that includes: a transmitter that communicates with an external device, and transmits a monitoring log generated in the information processing device to the external device; a first monitor that verifies an integrity of internal processing of the information processing device; and a second monitor that verifies an integrity of the first monitor, the control method including: repeatedly outputting, by the second monitor, a heartbeat signal to the transmitter; each time the heartbeat signal is output from the second monitor, transmitting, by the transmitter, the heartbeat signal to the external device; when the integrity of the internal processing of the information processing device is anomalous, outputting, by the first monitor, an output stop request signal to the second monitor, the output stop request signal being a signal for requesting the second monitor to stop outputting the heartbeat signal or output an invalid heartbeat signal; and stopping outputting the heartbeat signal or outputting the invalid heartbeat signal based on the output stop request signal, by the second monitor.

According to this aspect, the first monitor outputs the output stop request signal to the second monitor in the case where the integrity of internal processing (for example, the transmitter) of the information processing device is anomalous. Hence, in the case where the reception of the heartbeat signal from the information processing device is interrupted or the external device receives an invalid heartbeat signal from the information processing device, the external device can detect, for example, that the transmitter in the information processing device has been compromised.

In a ninth aspect of the present disclosure, in the control method for the information processing device according to the eighth aspect, the first monitor may verify an integrity of the transmitter.

According to this aspect, it is possible to detect that the transmitter in the information processing device has been compromised.

An information processing device according to a tenth aspect of the present disclosure includes: a transmitter that communicates with an external device, and transmits a monitoring log generated in the information processing device to the external device; a first monitor that verifies an integrity of internal processing of the information processing device; and a second monitor that, whenever activated, performs at least one of verification of an integrity of the first monitor or output of a heartbeat signal to the transmitter, wherein each time the heartbeat signal is output from the second monitor, the transmitter transmits the heartbeat signal to the external device, and when the integrity of the first monitor is anomalous, the second monitor stops outputting the heartbeat signal or outputs an invalid heartbeat signal.

According to this aspect, for example, the second monitor is repeatedly activated at predetermined timing. Hence, in the case where the reception of the heartbeat signal from the information processing device is interrupted or the external device receives an invalid heartbeat signal from the information processing device, the external device can detect that the information processing device has been compromised. Moreover, the second monitor stops outputting the heartbeat signal or outputs an invalid heartbeat signal in the case where the integrity of the first monitor is anomalous. Hence, in the case where the reception of the heartbeat signal from the information processing device is interrupted or the external device receives an invalid heartbeat signal from the information processing device, the external device can detect that the information processing device has been compromised.

In an eleventh aspect of the present disclosure, in the information processing device according to the tenth aspect, the first monitor may verify an integrity of the transmitter.

According to this aspect, it is possible to detect that the transmitter in the information processing device has been compromised.

These general and specific aspects may be implemented using a system, a method, an integrated circuit, a computer program, or a computer-readable recording medium such as CD-ROM, or any combination of systems, methods, integrated circuits, computer programs, and recording media.

Embodiments will be described in detail below, with reference to the drawings.

The embodiments described below each show a general or specific example. The numerical values, shapes, materials, structural elements, the arrangement and connection of the structural elements, steps, the processing order of the steps etc. shown in the following embodiments are mere examples, and do not limit the scope of the present disclosure. Of the structural elements in the embodiments described below, the structural elements not recited in any one of the independent claims representing the broadest concepts are described as optional structural elements.

Embodiment 1

[1. Overview of Information Processing Device]

First, an overview of information processing device 2 according to Embodiment 1 will be described with reference to FIG. 1. FIG. 1 is a diagram illustrating an overview of information processing device 2 according to Embodiment 1.

Information processing device 2 is used, for example, as an electronic control unit (ECU) mounted on a vehicle such as an automobile. After startup (activation) of each computer program (hereafter simply referred to as "program") in information processing device 2, information processing device 2 executes constant integrity (RI) verification for the program. Herein, "integrity" means that the program in information processing device 2 has not been subjected to unauthorized tampering or the like. The expression "the integrity is anomalous" means that the program in information processing device 2 has been subjected to unauthorized tampering or the like and as a result has been compromised.

As illustrated in FIG. 1, information processing device 2 is constructed in a state of being virtually separated into usual region 4 (an example of a first program region) and robust region 6 (an example of a second program region). Usual region 4 is an execution environment for executing non-secure operating systems and applications. Robust region 6 is an execution environment for executing secure operating systems and applications, and is isolated from usual region 4. That is, robust region 6 has a security level higher than the security level of usual region 4. For example, access from usual region 4 to robust region 6 is restricted by the function of a processor or the like included in information processing device 2.

Usual region 4 includes user space 8 and kernel space 10. User space 8 is a memory region used by applications. Kernel space 10 is a memory region used by the kernel.

Information processing device 2 includes monitoring root of trust (ROT) 12 (an example of a second monitor), host-based intrusion detection system (HIDS) monitor 14 (an example of a first monitor), a plurality of HIDSs 16, 18, 20, and 22 (each an example of an anomaly detector), and log transmitter 24 (an example of a transmitter). In information processing device 2, constant integrity (RI) verification for each program is executed using monitoring ROT 12 as a root of trust. Monitoring RoT 12, HIDS monitor 14, the plurality of HIDSs 16, 18, 20, and 22, and log transmitter 24 are connected so as to be communicable with each other via bus 26.

Each of monitoring RoT 12, HIDS monitor 14, the plurality of HIDSs 16, 18, 20, and 22, and log transmitter 24 is implemented, for example, by a program execution unit such as a central processing unit (CPU) or a processor reading and executing a program recorded in memory.

Monitoring RoT 12 operates in robust region 6. Monitoring ROT 12 monitors HIDS monitor 14 to verify the integrity of HIDS monitor 14. Upon verifying that the integrity of HIDS monitor 14 is anomalous, monitoring RoT 12 outputs a monitoring log indicating the verification result of the integrity of HIDS monitor 14 to log transmitter 24 via bus 26.

Moreover, monitoring RoT 12 repeatedly outputs a heartbeat signal to log transmitter 24 via bus 26, for example, with a predetermined period (or predetermined timing). The heartbeat signal is a keep-alive signal indicating that the constant integrity (RI) verification function made up of monitoring RoT 12, HIDS monitor 14, and log transmitter 24 is operating normally. Monitoring ROT 12 stops outputting the heartbeat signal based on an output stop request signal (described later) from HIDS monitor 14.

Although monitoring RoT 12 stops outputting the heartbeat signal based on the output stop request signal from HIDS monitor 14 in this embodiment, the present disclosure is not limited to such, and monitoring RoT 12 may output an invalid heartbeat signal. Herein, the invalid heartbeat signal is a heartbeat signal to which an authentic signature generated by signature generator 34 (described later) is not attached, or a heartbeat signal to which dummy data is attached instead of the authentic signature.

HIDS monitor 14 operates in kernel space 10 in usual region 4. HIDS monitor 14 monitors internal processing of information processing device 2 to verify the integrity of internal processing of information processing device 2. Specifically, HIDS monitor 14 monitors each of the plurality of HIDSs 16, 18, 20, and 22 and log transmitter 24 to verify the integrity of each of the plurality of HIDSs 16, 18, 20, and 22 and log transmitter 24. In the case where HIDS monitor 14 verifies that the integrity of at least one of the plurality of HIDSs 16, 18, 20, and 22 is anomalous, HIDS monitor 14 outputs a monitoring log indicating the verification result of the integrity of the at least one HIDS to log transmitter 24 via bus 26.

In the case where HIDS monitor 14 verifies that the integrity of log transmitter 24 is anomalous, HIDS monitor 14 outputs a monitoring log (an example of a first monitoring log) indicating the verification result of the integrity of log transmitter 24 to log transmitter 24 via bus 26. Moreover, in the case where HIDS monitor 14 verifies that the integrity of log transmitter 24 is anomalous, HIDS monitor 14 outputs, to monitoring RoT 12 via bus 26, an output stop request signal for requesting monitoring RoT 12 to stop outputting the heartbeat signal.

Although HIDS monitor 14 monitors each of the plurality of HIDSs 16, 18, 20, and 22 and log transmitter 24 in this embodiment, the present disclosure is not limited to such, and HIDS monitor 14 may monitor any component other than the plurality of HIDSs 16, 18, 20, and 22 and log transmitter 24. Although HIDS monitor 14 outputs an output stop request signal for requesting monitoring ROT 12 to stop outputting the heartbeat signal in this embodiment, the present disclosure is not limited to such, and HIDS monitor 14 may output an output stop request signal for requesting monitoring ROT 12 to output an invalid heartbeat signal.

Each of the plurality of HIDSs 16, 18, 20, and 22 operates in usual region 4. More specifically, HIDSs 16 and 18 operate in kernel space 10 in usual region 4, and HIDSs 20 and 22 operate in user space 8 in usual region 4. Each of the plurality of HIDSs 16, 18, 20, and 22 monitors each program in information processing device 2. When each of the plurality of HIDSs 16, 18, 20, and 22 detects an anomaly (for example, unauthorized behavior of the program) in information processing device 2, the HIDS outputs a monitoring log (an example of a second monitoring log) indicating the detection result of the anomaly in information processing device 2 to log transmitter 24 via bus 26.

Log transmitter 24 can communicate with security operation center (SOC) 28 (an example of an external device) located outside the vehicle on which information processing device 2 is mounted, for example wirelessly via a network. Specifically, log transmitter 24 transmits the monitoring log output from each of monitoring ROT 12, HIDS monitor 14, and the plurality of HIDSs 16, 18, 20, and 22, to SOC 28 via the network. By analyzing the monitoring log received from information processing device 2, SOC 28 can detect that an anomaly has occurred in information processing device 2.

Moreover, each time the heartbeat signal is output from monitoring RoT 12, log transmitter 24 transmits (transfers) the heartbeat signal to SOC 28 via the network. That is, log transmitter 24 repeatedly transmits the heartbeat signal from monitoring ROT 12 to SOC 28 with the predetermined period (or the predetermined timing). Thus, upon receiving the heartbeat signal from information processing device 2, SOC 28 can determine that the constant integrity (RI) verification function of information processing device 2 is operating normally. In the case where SOC 28 cannot receive the next heartbeat signal for more than the predetermined period of time after receiving the heartbeat signal, SOC 28 can detect that log transmitter 24 in information processing device 2 has been compromised (for example, the program has been tampered with unauthorizedly).

In the case where monitoring RoT 12 outputs an invalid heartbeat signal based on the output stop request signal, the following process may be performed. Having received the invalid heartbeat signal, SOC 28 can detect that log transmitter 24 in information processing device 2 has been compromised as a result of determining that the authentic signature is not attached to the invalid heartbeat signal or failing to verify the signature of the invalid heartbeat signal.

[2. Functional Structure of Monitoring RoT]

Figure 2:
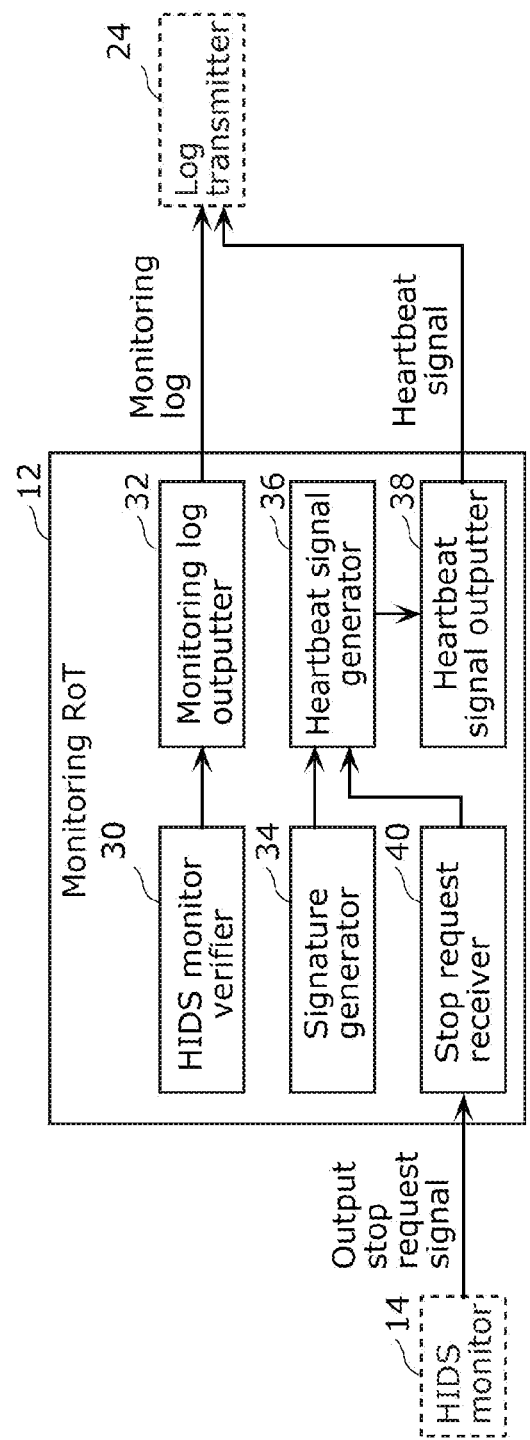
FIG. 2 is a block diagram illustrating the functional structure of a monitoring ROT according to Embodiment 1.

Next, the functional structure of monitoring RoT 12 according to Embodiment 1 will be described with reference to FIG. 2. FIG. 2 is a block diagram illustrating the functional structure of monitoring RoT 12 according to Embodiment 1.

As illustrated in FIG. 2, monitoring RoT 12 includes, as its functional structure, HIDS monitor verifier 30, monitoring log outputter 32, signature generator 34, heartbeat signal generator 36, heartbeat signal outputter 38, and stop request receiver 40.

HIDS monitor verifier 30 verifies the integrity of HIDS monitor 14, and outputs the verification result to monitoring log outputter 32.

Monitoring log outputter 32, in the case where HIDS monitor verifier 30 verifies that the integrity of HIDS monitor 14 is anomalous, generates a monitoring log indicating that the integrity of HIDS monitor 14 is anomalous based on the verification result from HIDS monitor verifier 30. Monitoring log outputter 32 outputs the generated monitoring log to log transmitter 24.

Signature generator 34 generates a signature and outputs the generated signature to heartbeat signal generator 36. Herein, the signature is an electronic signature attached to the heartbeat signal generated by heartbeat signal generator 36 in order to authenticate the validity of the heartbeat signal.

Heartbeat signal generator 36 generates a heartbeat signal to which a time stamp and the signature generated by signature generator 34 are attached, with the predetermined period (or the predetermined timing). Heartbeat signal generator 36 outputs the generated heartbeat signal to heartbeat signal outputter 38.

Heartbeat signal outputter 38, each time the heartbeat signal is generated by heartbeat signal generator 36, outputs the generated heartbeat signal to log transmitter 24. That is, heartbeat signal outputter 38 repeatedly outputs the heartbeat signal generated by heartbeat signal generator 36 to log transmitter 24 with the predetermined period (or the predetermined timing).

Stop request receiver 40 receives an output stop request signal from HIDS monitor 14, thus receiving a request to stop outputting the heartbeat signal from HIDS monitor 14. Upon receiving the output stop request signal from HIDS monitor 14, stop request receiver 40 instructs heartbeat signal generator 36 to stop generating the heartbeat signal. Based on the instruction from stop request receiver 40, heartbeat signal generator 36 stops generating the heartbeat signal. Heartbeat signal outputter 38 consequently stops outputting the heartbeat signal.

Although stop request receiver 40 instructs heartbeat signal generator 36 to stop generating the heartbeat signal upon receiving the output stop request signal from HIDS monitor 14 in this embodiment, the present disclosure is not limited to such. For example, stop request receiver 40 may directly instruct heartbeat signal outputter 38 to stop outputting the heartbeat signal upon receiving the output stop request signal from HIDS monitor 14.

[3. Functional Structure of HIDS Monitor]

Figure 3:
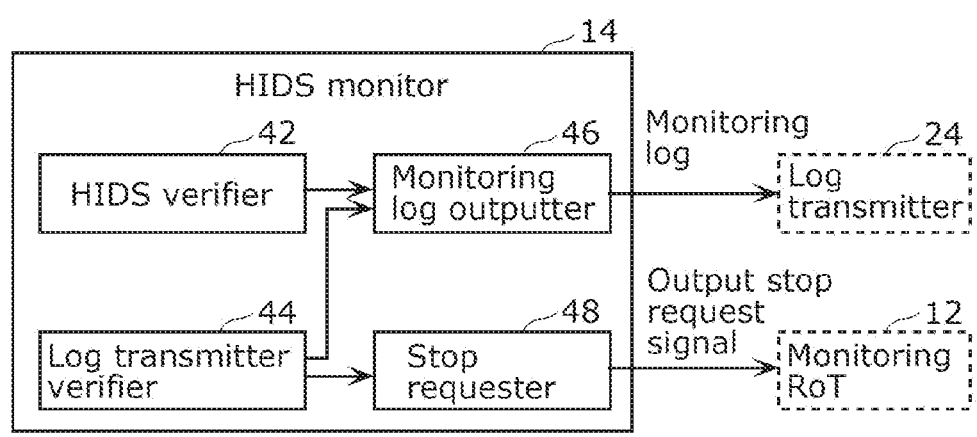
FIG. 3 is a block diagram illustrating the functional structure of an HIDS monitor according to Embodiment 1.

Next, the functional structure of HIDS monitor 14 according to Embodiment 1 will be described with reference to FIG. 3. FIG. 3 is a block diagram illustrating the functional structure of HIDS monitor 14 according to Embodiment 1.

As illustrated in FIG. 3, HIDS monitor 14 includes, as its functional structure, HIDS verifier 42, log transmitter verifier 44, monitoring log outputter 46, and stop requester 48.

HIDS verifier 42 verifies the integrity of each of the plurality of HIDSs 16, 18, 20, and 22, and outputs the verification result to monitoring log outputter 46.

Log transmitter verifier 44 verifies the integrity of log transmitter 24, and outputs the verification result to monitoring log outputter 46.

Monitoring log outputter 46, in the case where HIDS verifier 42 verifies that the integrity of at least one of the plurality of HIDSs 16, 18, 20, and 22 is anomalous, generates a monitoring log indicating that the integrity of at least one of the plurality of HIDSs 16, 18, 20, and 22 is anomalous based on the verification result from HIDS verifier 42. Monitoring log outputter 46 outputs the generated monitoring log to log transmitter 24.

Moreover, in the case where log transmitter verifier 44 verifies that the integrity of log transmitter 24 is anomalous, monitoring log outputter 46 generates a monitoring log indicating that the integrity of log transmitter 24 is anomalous based on the verification result from log transmitter verifier 44. Monitoring log outputter 46 outputs the generated monitoring log to log transmitter 24.

Stop requester 48, in the case where log transmitter verifier 44 verifies that the integrity of log transmitter 24 is anomalous, outputs, to monitoring RoT 12, an output stop request signal for requesting monitoring RoT 12 to stop outputting the heartbeat signal, based on the verification result from log transmitter verifier 44.

[4. Operation of Information Processing Device]
[4-1. Operation of Monitoring RoT]

Figure 4:
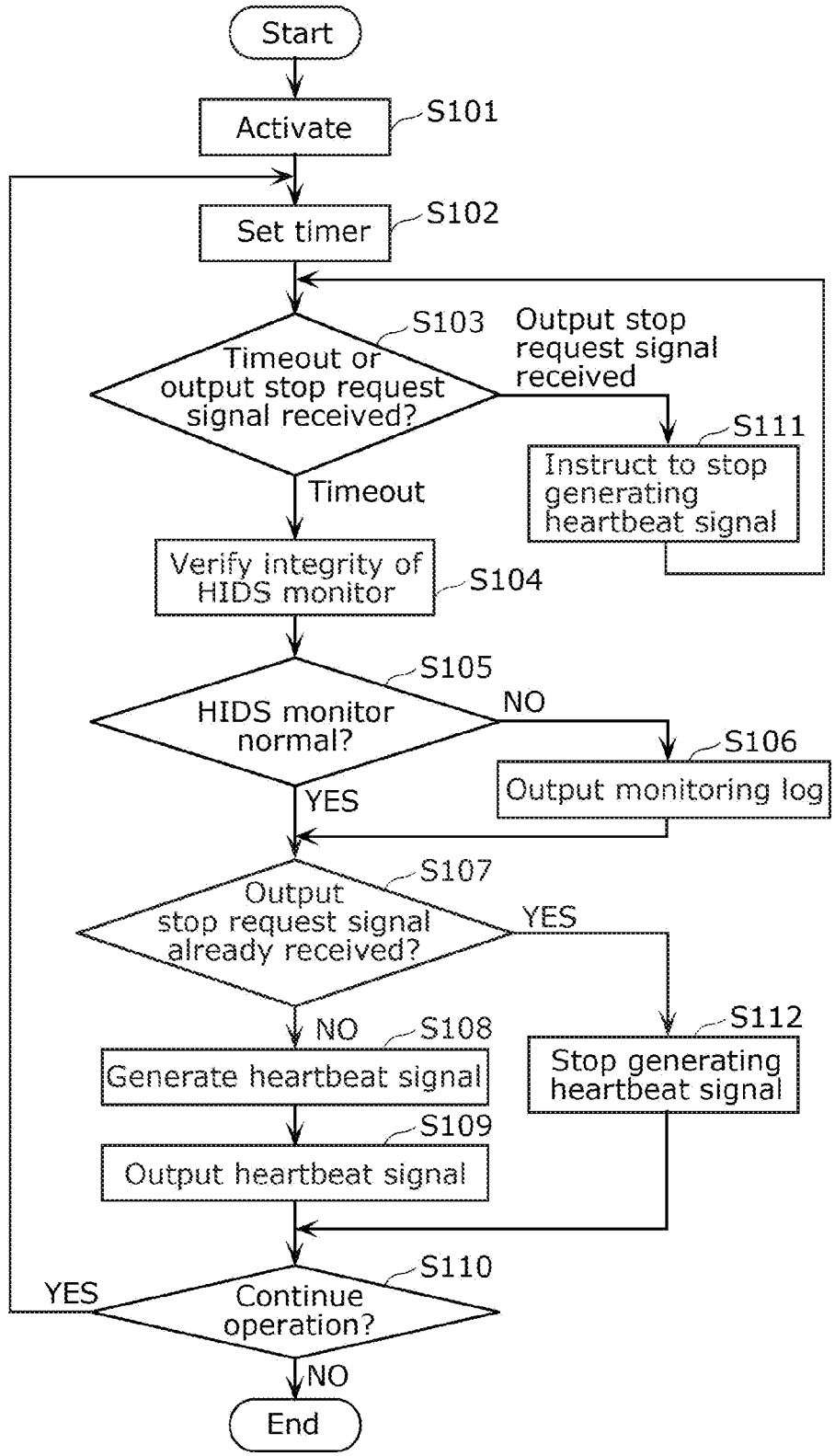
FIG. 4 is a flowchart illustrating the flow of operation of the monitoring ROT according to Embodiment 1.

The operation of monitoring RoT 12 according to Embodiment 1 will be described with reference to FIG. 4. FIG. 4 is a flowchart illustrating the flow of operation of monitoring RoT 12 according to Embodiment 1.

First, the operation of monitoring ROT 12 in the case where stop request receiver 40 has not received an output stop request signal will be described. As illustrated in FIG. 4, when information processing device 2 is activated (S101), HIDS monitor verifier 30 sets a timer that measures a predetermined time (for example, 10 seconds) (S102). When the timer times out (S103: "timeout"), HIDS monitor verifier 30 verifies the integrity of HIDS monitor 14 (S104).

In the case where HIDS monitor verifier 30 verifies that the integrity of HIDS monitor 14 is not anomalous (i.e. HIDS monitor 14 is normal) (S105: YES), the process advances to Step S107 without monitoring log outputter 32 outputting a monitoring log.

In the case where HIDS monitor verifier 30 verifies that the integrity of HIDS monitor 14 is anomalous (i.e. HIDS monitor 14 is not normal) (S105: NO), on the other hand, monitoring log outputter 32 outputs a monitoring log based on the verification result from HIDS monitor verifier 30 (S106), and then the process advances to Step S107.

After Step S105 or S106, since stop request receiver 40 has not received the output stop request signal (S107: NO), heartbeat signal generator 36 generates a heartbeat signal (S108). Heartbeat signal outputter 38 then outputs the heartbeat signal generated by heartbeat signal generator 36 to log transmitter 24 (S109).

In the case of continuing the operation of information processing device 2 (S110: YES), the process returns to Step S102. In the case of ending the operation of information processing device 2 (S110: NO), the flowchart in FIG. 4 ends.

Next, the operation of monitoring ROT 12 in the case where stop request receiver 40 receives an output stop request signal will be described. As illustrated in FIG. 4, Steps S101 and S102 are executed in the same manner as above. After Step S102, in the case where stop request receiver 40 receives the output stop request signal (S103: "output stop request signal received"), stop request receiver 40 instructs heartbeat signal generator 36 to stop generating the heartbeat signal (S111).

The process then returns to Step S103. When the timer times out (S103: "timeout"), Steps S104 to S106 are executed in the same manner as above. After Step S105 or S106, since stop request receiver 40 has already received the output stop request signal (S107: YES), heartbeat signal generator 36 stops generating the heartbeat signal based on the instruction from stop request receiver 40 (S112). The process then advances to Step S110.

[4-2. Operation of HIDS Monitor]

Figure 5:
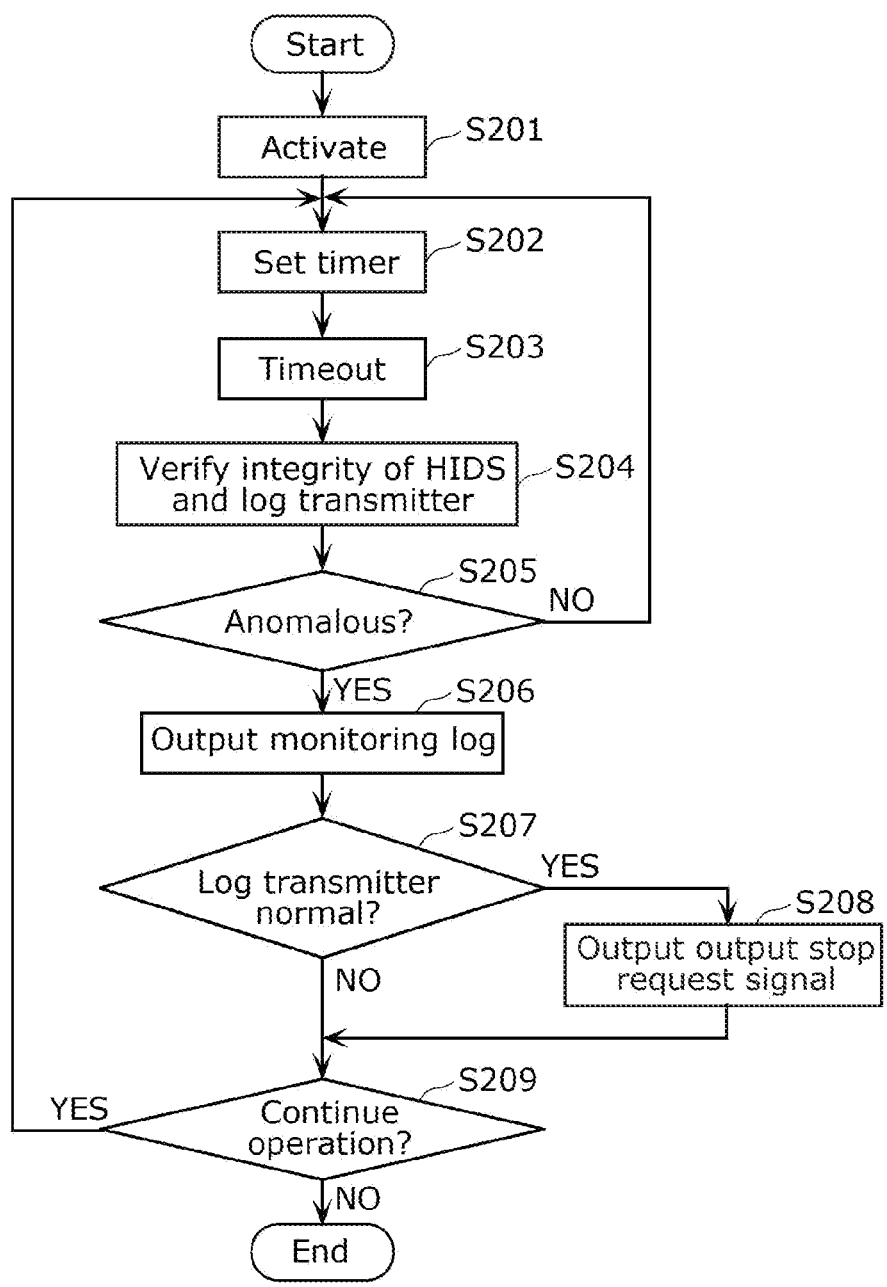
FIG. 5 is a flowchart illustrating the flow of operation of the HIDS monitor according to Embodiment 1.

The operation of HIDS monitor 14 according to Embodiment 1 will be described with reference to FIG. 5. FIG. 5 is a flowchart illustrating the flow of operation of HIDS monitor 14 according to Embodiment 1.

As illustrated in FIG. 5, when information processing device 2 is activated (S201), each of HIDS verifier 42 and log transmitter verifier 44 sets a timer that measures a predetermined time (for example, 10 seconds) (S202). When the timer times out (S203), HIDS verifier 42 verifies the integrity of each of the plurality of HIDSs 16, 18, 20, and 22, and log transmitter verifier 44 verifies the integrity of log transmitter 24 (S204).

In the case where the integrity of each of the plurality of HIDSs 16, 18, 20, and 22 and log transmitter 24 is not anomalous (S205: NO), the process returns to Step S202. In the case where the integrity of at least one of the plurality of HIDSs 16, 18, 20, and 22 and log transmitter 24 is anomalous (S205: YES), monitoring log outputter 46 outputs a monitoring log to log transmitter 24 (S206).

In the case where the integrity of at least one of the plurality of HIDSs 16, 18, 20, and 22 and log transmitter 24 is anomalous and the integrity of log transmitter 24 is anomalous (i.e. log transmitter 24 is not normal) (S207: NO), stop requester 48 outputs an output stop request signal to monitoring ROT 12 based on the verification result from log transmitter verifier 44 (S208).

In the case of continuing the operation of information processing device 2 (S209: YES), the process returns to Step S202. In the case of ending the operation of information processing device 2 (S209: NO), the flowchart in FIG. 5 ends.

In the case where the integrity of at least one of the plurality of HIDSs 16, 18, 20, and 22 and log transmitter 24 is anomalous and the integrity of log transmitter 24 is not anomalous (i.e. log transmitter 24 is normal but any of the plurality of HIDSs 16, 18, 20, and 22 is not normal) (S207: YES), the process advances to Step S209 without stop requester 48 outputting an output stop request signal to monitoring ROT 12.

[5. Effects]

As described above, in this embodiment, in the case where the integrity of log transmitter 24 is not anomalous, log transmitter 24 repeatedly transmits the heartbeat signal from monitoring RoT 12 to SOC 28. Thus, SOC 28 can recognize that log transmitter 24 in information processing device 2 is normal while uninterruptedly receiving the heartbeat signal from information processing device 2.

In the case where the integrity of log transmitter 24 is anomalous, on the other hand, monitoring RoT 12 stops outputting the heartbeat signal. Log transmitter 24 consequently stops transmitting the heartbeat signal to SOC 28. Since the reception of the heartbeat signal from information processing device 2 is interrupted, SOC 28 can detect that log transmitter 24 in information processing device 2 has been compromised.

Moreover, the heartbeat signal transmitted by log transmitter 24 is signed by monitoring RoT 12, as described above. Hence, SOC 28 can recognize that log transmitter 24 in information processing device 2 is normal by determining that the received heartbeat signal has the signature attached thereto.

For example, if log transmitter 24 is compromised as a result of being attacked by an unauthorized program, there is a possibility that the unauthorized program impersonates log transmitter 24 and unauthorizedly generates a heartbeat signal and transmits it to SOC 28. However, such a heartbeat signal generated by the unauthorized program does not have the signature generated by monitoring ROT 12. Therefore, SOC 28 can detect that log transmitter 24 in information processing device 2 has been compromised by determining that the received heartbeat signal does not have the signature attached thereto.

[6. Variations]
[6-1. Variation 1]

In this embodiment, in the case where log transmitter verifier 44 verifies that the integrity of log transmitter 24 is anomalous, monitoring log outputter 46 in HIDS monitor 14 outputs a monitoring log indicating that the integrity of log transmitter 24 is anomalous to log transmitter 24. This may be modified, for example, as follows.

In the case where log transmitter verifier 44 verifies that the integrity of log transmitter 24 is anomalous, monitoring log outputter 46 may output a signature request signal to monitoring ROT 12. The signature request signal is a signal for requesting monitoring ROT 12 to sign the monitoring log indicating the verification result of the integrity of log transmitter 24.

In this case, after HIDS monitor verifier 30 in monitoring ROT 12 determines that the integrity of HIDS monitor 14 is not anomalous, signature generator 34 in monitoring RoT 12 signs the monitoring log based on the signature request signal from HIDS monitor 14. Signature generator 34 then outputs the signed monitoring log to monitoring log outputter 46 in HIDS monitor 14.

Signature generator 34 in monitoring ROT 12 also signs the monitoring log output by monitoring log outputter 46 in HIDS monitor 14 based on the signature request signal from HIDS monitor 14. Monitoring log outputter 46 holds (stores) the monitoring log signed by signature generator 34 in memory such as nonvolatile memory. Thus, in the case where log transmitter verifier 44 verifies that the integrity of log transmitter 24 is anomalous, the monitoring log indicating that the integrity of log transmitter 24 is anomalous can be preserved, and security personnel or the like can later read the monitoring log from the memory and use it to analyze compromised log transmitter 24.

The monitoring logs output by monitoring log outputter 46 in HIDS monitor 14 may include not only the monitoring log indicating that the integrity of log transmitter 24 is anomalous but also the respective monitoring logs for the plurality of HIDSs 16, 18, 20, and 22 each indicating that the integrity of the corresponding HIDS is anomalous. This makes it possible to analyze not only compromised log transmitter 24 but also the compromised plurality of HIDSs 16, 18, 20, and 22.

[6-2. Variation 2]

In this embodiment, heartbeat signal generator 36 in monitoring RoT 12 stops generating the heartbeat signal in the case where stop request receiver 40 receives the output stop request signal from HIDS monitor 14. This may be modified, for example, as follows.

In the case where HIDS monitor verifier 30 verifies that the integrity of HIDS monitor 14 is anomalous, heartbeat signal generator 36 may stop generating the heartbeat signal based on the verification result from HIDS monitor verifier 30. Heartbeat signal outputter 38 consequently stops outputting the heartbeat signal.

Since the reception of the heartbeat signal from information processing device 2 is interrupted, SOC 28 can detect that at least one of log transmitter 24 or HIDS monitor 14 in information processing device 2 has been compromised.

Monitoring log outputter 32 in monitoring RoT 12 may generate a monitoring log indicating that the integrity of HIDS monitor 14 is anomalous based on the verification result from HIDS monitor verifier 30, and hold the generated monitoring log in memory such as nonvolatile memory.

Alternatively, in the case where HIDS monitor verifier 30 verifies that the integrity of HIDS monitor 14 is anomalous, heartbeat signal generator 36 may generate an invalid heartbeat signal based on the verification result from HIDS monitor verifier 30. Heartbeat signal outputter 38 consequently outputs the invalid heartbeat signal.

[6-3. Variation 3]

In this embodiment, stop requester 48 in HIDS monitor 14 outputs the output stop request signal to monitoring ROT 12 in the case where log transmitter verifier 44 verifies that the integrity of log transmitter 24 is anomalous. This may be modified, for example, as follows.

After outputting the output stop request signal, in the case where log transmitter verifier 44 verifies that the anomaly in the integrity of log transmitter 24 has been resolved, stop requester 48 may output an output resumption request signal to monitoring ROT 12 based on the verification result from log transmitter verifier 44. The output resumption request signal is a signal for requesting monitoring RoT 12 to resume outputting the heartbeat signal. Heartbeat signal generator 36 in monitoring ROT 12 resumes generating the heartbeat signal based on the output resumption request signal from HIDS monitor 14. Heartbeat signal outputter 38 consequently resumes outputting the heartbeat signal.

Thus, upon the resumption of the reception of the heartbeat signal from information processing device 2, SOC 28 can recognize that log transmitter 24 in information processing device 2 has been restored.

[6-4. Variation 4]

In this embodiment, each of the plurality of HIDSs 16, 18, 20, and 22, upon detecting an anomaly in information processing device 2, outputs a monitoring log indicating the detection result of the anomaly in information processing device 2 to log transmitter 24. This may be modified, for example, as follows.

Each of the plurality of HIDSs 16, 18, 20, and 22 may transmit the monitoring log to log transmitter 24 in the case where the integrity of log transmitter 24 is not anomalous, and hold the monitoring log in memory such as nonvolatile memory in the case where the integrity of log transmitter 24 is anomalous. Alternatively, each of the plurality of HIDSs 16, 18, 20, and 22 may transmit the monitoring log to log transmitter 24 and also hold the monitoring log in memory in the case where the integrity of log transmitter 24 is not anomalous, and stop the transmission of the monitoring log to log transmitter 24 and hold the monitoring log in the memory in the case where the integrity of log transmitter 24 is anomalous. In this way, the monitoring log generated by each of the plurality of HIDSs 16, 18, 20, and 22 can be preserved even in the case where log transmitter 24 is compromised.

Each of the plurality of HIDSs 16, 18, 20, and 22 may receive the heartbeat signal from monitoring RoT 12. Hence, upon the interruption of the reception of the heartbeat signal from monitoring RoT 12, each of the plurality of HIDSs 16, 18, 20, and 22 can recognize that the integrity of log transmitter 24 is anomalous.

Alternatively, in the case where HIDS monitor verifier 30 in monitoring RoT 12 verifies that the integrity of log transmitter 24 is anomalous, monitoring RoT 12 may notify each of the plurality of HIDSs 16, 18, 20, and 22 that the integrity of log transmitter 24 is anomalous. Each of the plurality of HIDSs 16, 18, 20, and 22 can then recognize that the integrity of log transmitter 24 is anomalous based on the notification from monitoring RoT 12.

[6-5. Variation 5]

Although the plurality of HIDSs 16, 18, 20, and 22 and log transmitter 24 are separate components in this embodiment, the present disclosure is not limited to such, and log transmitter 24 may have a function as a HIDS.

Although a host-based IDS (HIDS) is used as an anomaly detector in this embodiment, the present disclosure is not limited to such, and a network-based intrusion detection system (NIDS) may be used, for example.

Although monitoring RoT 12 operates in robust region 6 in this embodiment, the present disclosure is not limited to such, and monitoring RoT 12 may operate not in robust region 6 but in a usual region implemented to be software tamper resistant by obfuscation and the like.

Embodiment 2

Figure 6:
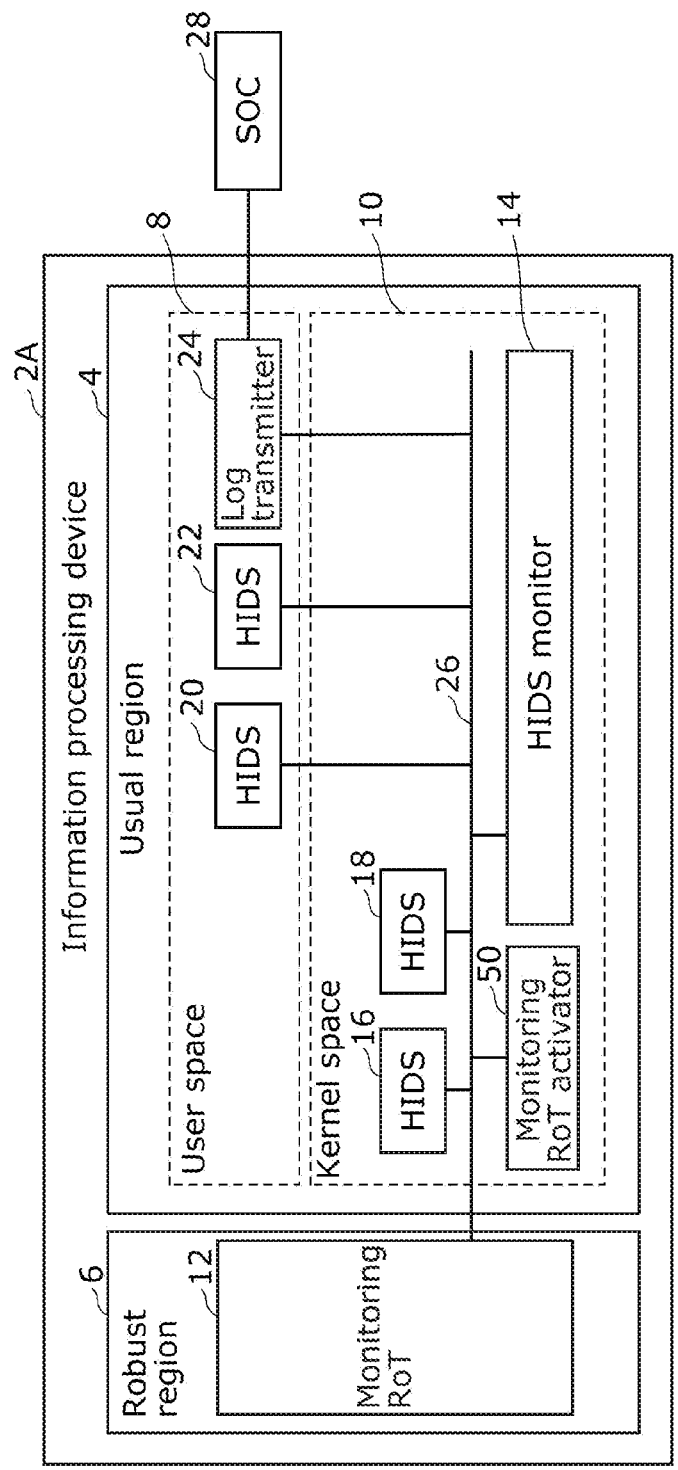
FIG. 6 is a diagram illustrating an overview of an information processing device according to Embodiment 2.

An overview of information processing device 2A according to Embodiment 2 will be described with reference to FIG. 6. FIG. 6 is a diagram illustrating an overview of information processing device 2A according to Embodiment 2. In this embodiment, the same structural elements as those in Embodiment 1 are given the same reference signs and their description will be omitted.

As illustrated in FIG. 6, information processing device 2A according to Embodiment 2 includes monitoring ROT activator 50 (an example of a monitoring activator) in addition to the structural elements described in Embodiment 1. Monitoring ROT activator 50 operates in kernel space 10 in usual region 4, and repeatedly activates monitoring RoT 12 with predetermined timing. The predetermined timing may be a predetermined period set in advance. Alternatively, each time monitoring ROT activator 50 activates monitoring RoT 12, monitoring ROT activator 50 may determine the next activation timing.

Each time monitoring RoT 12 is activated by monitoring ROT activator 50, monitoring RoT 12 performs the verification of the integrity of HIDS monitor 14 and the output of the heartbeat signal to log transmitter 24. In the case where the integrity of HIDS monitor 14 is anomalous, monitoring RoT 12 stops outputting the heartbeat signal. Alternatively, each time monitoring RoT 12 is activated by monitoring ROT activator 50, monitoring RoT 12 may perform only one of the verification of the integrity of HIDS monitor 14 and the output of the heartbeat signal to log transmitter 24.

This embodiment has the following effects. For example, if monitoring ROT activator 50 is compromised as a result of being attacked by an unauthorized program, monitoring RoT 12 stops being activated periodically. Consequently, log transmitter 24 stops transmitting the heartbeat signal to SOC 28. Since the reception of the heartbeat signal from information processing device 2A is interrupted, SOC 28 can detect that information processing device 2A has been compromised.

Moreover, monitoring RoT 12 stops outputting the heartbeat signal in the case where the integrity of HIDS monitor 14 is anomalous, as described above. Since the reception of the heartbeat signal from information processing device 2A is interrupted, SOC 28 can detect that information processing device 2A has been compromised.

(Other Variations, Etc.)

While an information processing device and a control method for an information processing device according to one or more aspects have been described above by way of the foregoing embodiments, the present disclosure is not limited to the foregoing embodiments. Other modifications obtained by applying various changes conceivable by a person skilled in the art to the foregoing embodiments and any combinations of the structural elements in different embodiments without departing from the scope of the present disclosure are also included in the scope of one or more aspects.

Although monitoring log outputter 32 outputs a monitoring log indicating that the integrity of HIDS monitor 14 is anomalous in each of the foregoing embodiments, the present disclosure is not limited to such, and monitoring log outputter 32 may output a monitoring log indicating that the integrity of HIDS monitor 14 is not anomalous.

Although monitoring log outputter 46 outputs a monitoring log indicating that the integrity of at least one of the plurality of HIDSs 16, 18, 20, and 22 is anomalous in each of the foregoing embodiments, the present disclosure is not limited to such, and monitoring log outputter 46 may output a monitoring log indicating that each of the plurality of HIDSs 16, 18, 20, and 22 is not anomalous.

Although monitoring log outputter 46 outputs a monitoring log indicating that the integrity of log transmitter 24 is anomalous in each of the foregoing embodiments, the present disclosure is not limited to such, and monitoring log outputter 46 may output a monitoring log indicating that the integrity of log transmitter 24 is not anomalous.

Each of the structural elements in each of the foregoing embodiments may be configured in the form of an exclusive hardware product, or may be implemented by executing a computer program suitable for the structural element. Each of the structural elements may be implemented by means of a program executing unit, such as a CPU and a processor, reading and executing a computer program recorded on a recording medium such as a hard disk or semiconductor memory.

Part or all of the functions of each of information processing devices 2 and 2A according to the foregoing embodiments may be implemented by a processor such as a CPU executing a computer program.

Part or all of the structural elements constituting each device may be configured as an IC card detachably mountable to the device or a standalone module. The IC card or the module is a computer system including a microprocessor, ROM, RAM, and so forth. The IC card or the module may include super-multifunctional LSI. The IC card or the module achieves its functions by the microprocessor operating according to a computer program. The IC card or the module may be tamper-resistant.

The present disclosure may be implemented as the methods described above. The present disclosure may be a computer program which implements these methods by a computer, or may be digital signals including the computer program. The present disclosure may be the computer program or the digital signals recorded in a non-transitory computer-readable recording medium, such as flexible disk, hard disk, CD-ROM, MO, DVD, DVD-ROM, DVD-RAM, Blu-ray (registered trademark) disc (BD), or semiconductor memory. The present disclosure may also be the digital signals recorded in these recording media. The present disclosure may be the computer program or the digital signals transmitted over a network such as an electric communication line, a wireless or wired communication line, or the Internet, data broadcasting, or the like. The present disclosure may be a computer system including a microprocessor and memory, where the memory stores the computer program and the microprocessor operates according to the computer program. The present disclosure may also be carried out by another independent computer system, by the computer program or the digital signals being recorded in the recording medium and transferred, or by the computer program or the digital signals being transferred over the network or the like.

Further Information about Technical Background to this Application

The disclosures of the following patent applications including specification, drawings, and claims are incorporated herein by reference in their entirety: Japanese Patent Application No. 2022-153360 filed on Sep. 27, 2022, and PCT International Application PCT/JP2023/003983 filed on Feb. 7, 2023.

INDUSTRIAL APPLICABILITY

The presently disclosed technique is applicable to, for example, an information processing device for executing constant integrity verification for various programs in an in-vehicle network.

The invention claimed is:

1. An information processing device comprising:
a transmitter that communicates with an external device, and transmits a monitoring log generated in the information processing device to the external device;
a first monitor that verifies an integrity of internal processing of the information processing device; and
a second monitor that verifies an integrity of the first monitor, and repeatedly outputs a heartbeat signal to the transmitter,
wherein each time the heartbeat signal is output from the second monitor, the transmitter transmits the heartbeat signal to the external device,
when the integrity of the internal processing of the information processing device is anomalous, the first monitor outputs, to the second monitor, an output stop request signal for requesting the second monitor to stop outputting the heartbeat signal or output an invalid heartbeat signal, and
the second monitor stops outputting the heartbeat signal or outputs the invalid heartbeat signal based on the output stop request signal.

2. The information processing device according to claim 1, further comprising:
a first program region in which each of the transmitter and the first monitor operates; and
a second program region in which the second monitor operates and that has a security level higher than a security level of the first program region.

3. The information processing device according to claim 1,
wherein the first monitor outputs a first monitoring log indicating a result of verifying the integrity of the internal processing of the information processing device, and when the integrity of the internal processing of the information processing device is anomalous, outputs, to the second monitor, a signature request signal for requesting the second monitor to sign the first monitoring log,
the second monitor signs the first monitoring log based on the signature request signal, and
the first monitor holds the first monitoring log signed by the second monitor.

4. The information processing device according to claim 1,
wherein when the integrity of the first monitor is anomalous, the second monitor stops outputting the heartbeat signal or outputs the invalid heartbeat signal.

5. The information processing device according to claim 1,
wherein when an anomaly of the integrity detected by the first monitor is resolved after the first monitor outputs the output stop request signal, the first monitor outputs, to the second monitor, an output resumption request signal for requesting the second monitor to resume outputting the heartbeat signal, and
the second monitor resumes outputting the heartbeat signal based on the output resumption request signal.

6. The information processing device according to claim 1, further comprising:
an anomaly detector that detects an anomaly in the information processing device, and outputs a second monitoring log indicating a result of detecting the anomaly in the information processing device,
wherein the first monitor further verifies an integrity of the anomaly detector, and
the anomaly detector holds the second monitoring log, when the integrity of the internal processing of the information processing device is anomalous.

7. The information processing device according to claim 1,
wherein the first monitor verifies an integrity of the transmitter.

8. A control method for an information processing device that includes: a transmitter that communicates with an external device, and transmits a monitoring log generated in the information processing device to the external device; a first monitor that verifies an integrity of internal processing of the information processing device; and a second monitor that verifies an integrity of the first monitor, the control method comprising:
repeatedly outputting, by the second monitor, a heartbeat signal to the transmitter;
each time the heartbeat signal is output from the second monitor, transmitting, by the transmitter, the heartbeat signal to the external device;
when the integrity of the internal processing of the information processing device is anomalous, outputting, by the first monitor, an output stop request signal to the second monitor, the output stop request signal being a signal for requesting the second monitor to stop outputting the heartbeat signal or output an invalid heartbeat signal; and stopping outputting the heartbeat signal or outputting the invalid heartbeat signal based on the output stop request signal, by the second monitor.

9. The control method for the information processing device according to claim 8, wherein the first monitor verifies an integrity of the transmitter.

10. An information processing device comprising:

a transmitter that communicates with an external device, and transmits a monitoring log generated in the information processing device to the external device;

a first monitor that verifies an integrity of internal processing of the information processing device; and a second monitor that, whenever activated, performs at least one of verification of an integrity of the first monitor or output of a heartbeat signal to the transmitter, wherein each time the heartbeat signal is output from the second monitor, the transmitter transmits the heartbeat signal to the external device, and when the integrity of the first monitor is anomalous, the second monitor stops outputting the heartbeat signal or outputs an invalid heartbeat signal.

11. The information processing device according to claim 10, wherein the first monitor verifies an integrity of the transmitter.

* * * * *